Oct. 13, 1959

H. S. V. JÄRUND 2,908,125

APPARATUS FOR AUTOMATICALLY PACKING
TETRAHEDRON-SHAPED PACKAGES

Filed May 13, 1957

Oct. 13, 1959     H. S. V. JÄRUND     2,908,125
APPARATUS FOR AUTOMATICALLY PACKING
TETRAHEDRON-SHAPED PACKAGES
Filed May 13, 1957     12 Sheets-Sheet 2
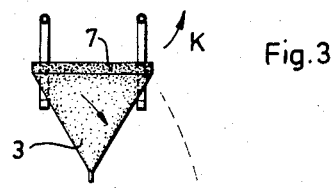
Fig. 3
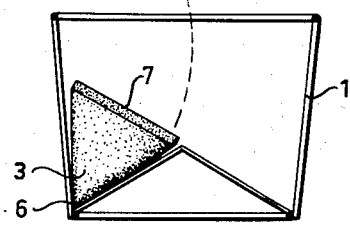
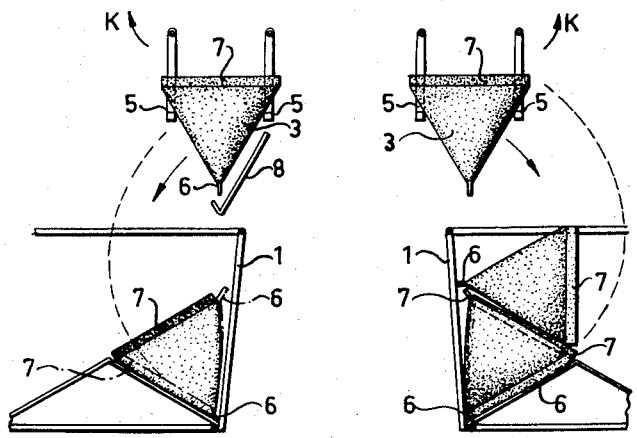
Fig. 4          Fig. 5

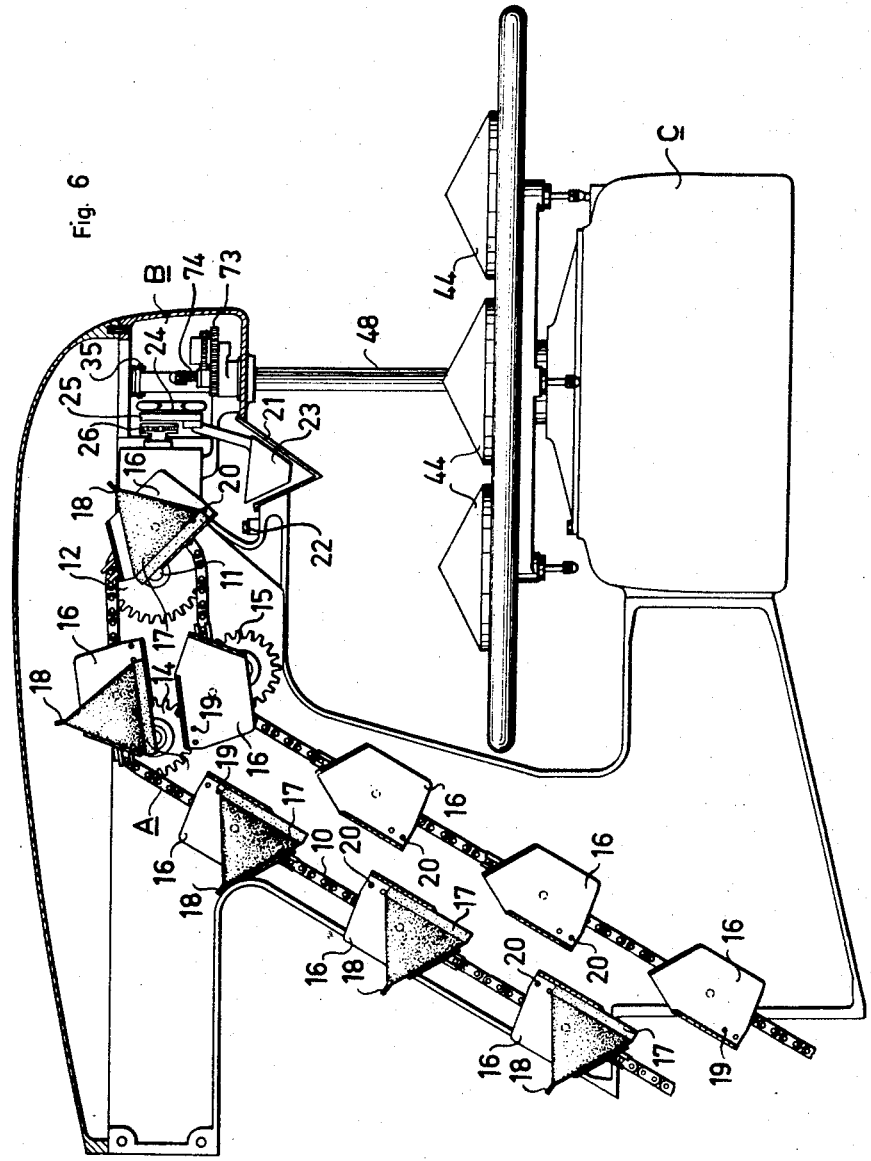

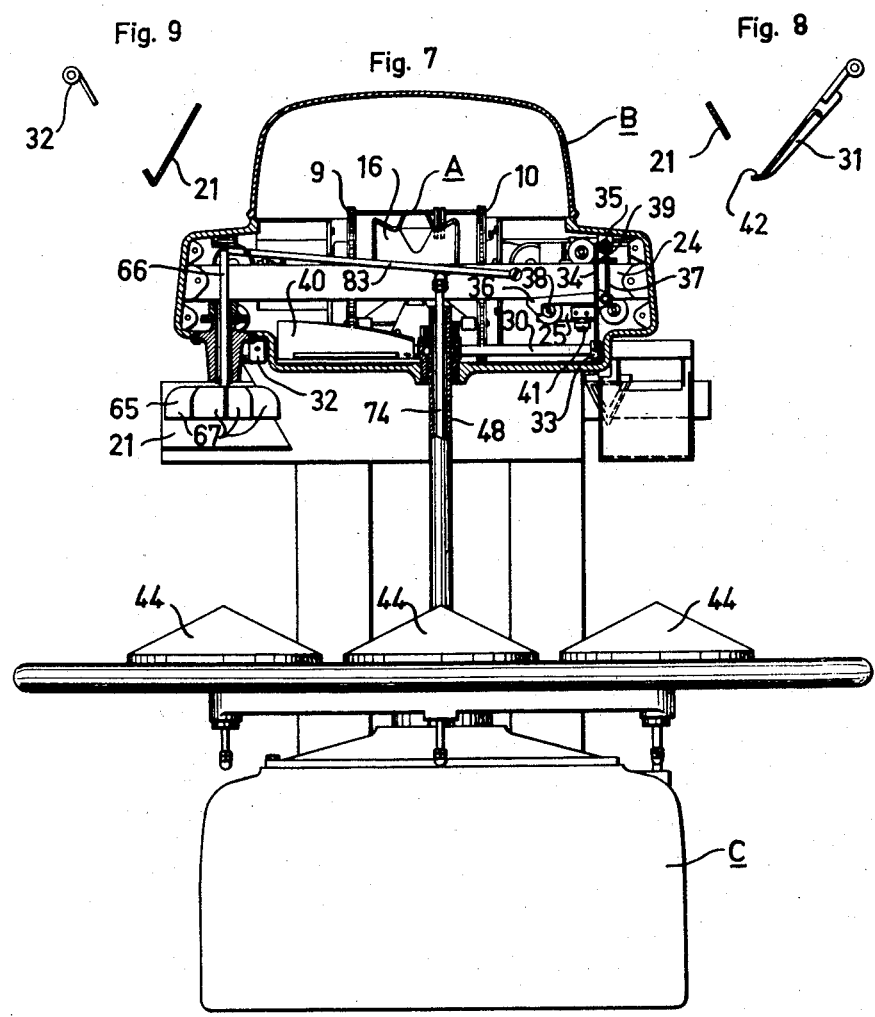

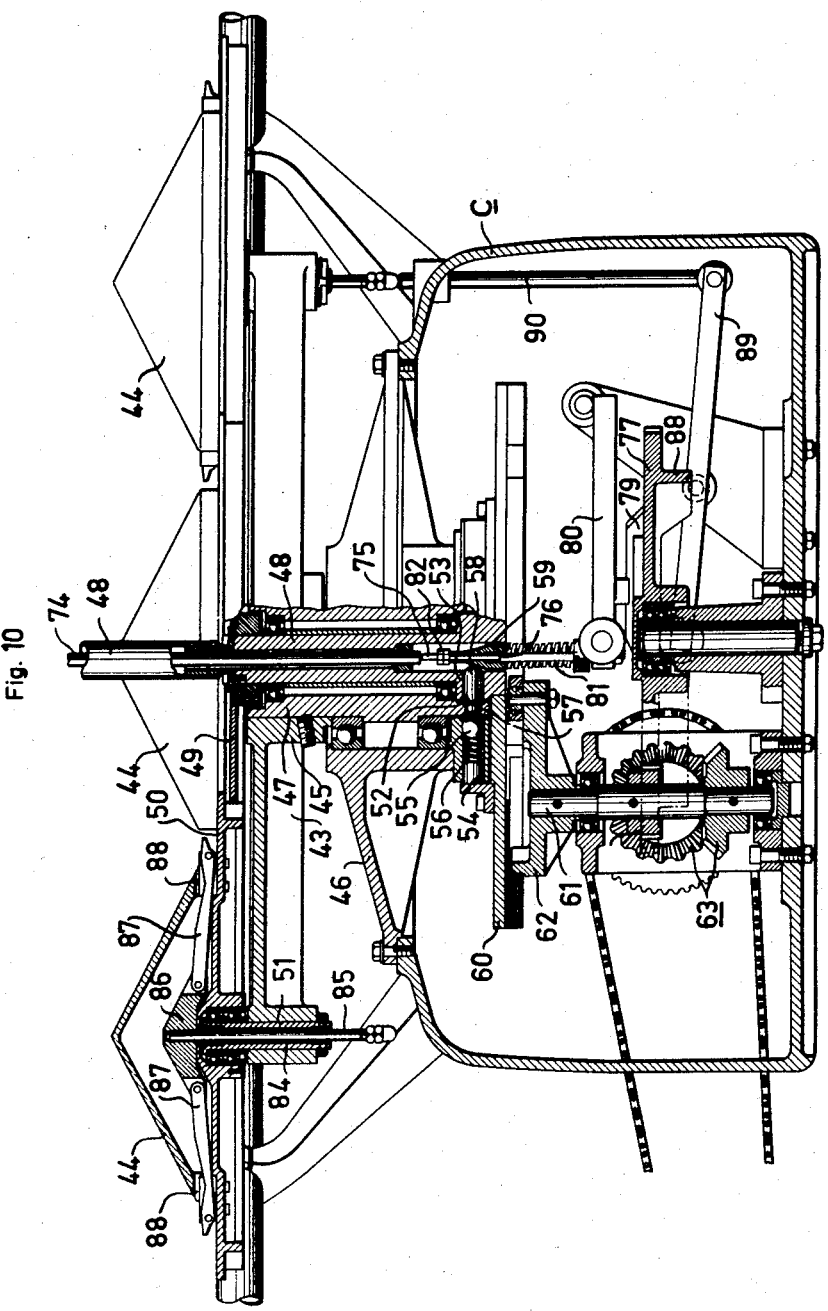

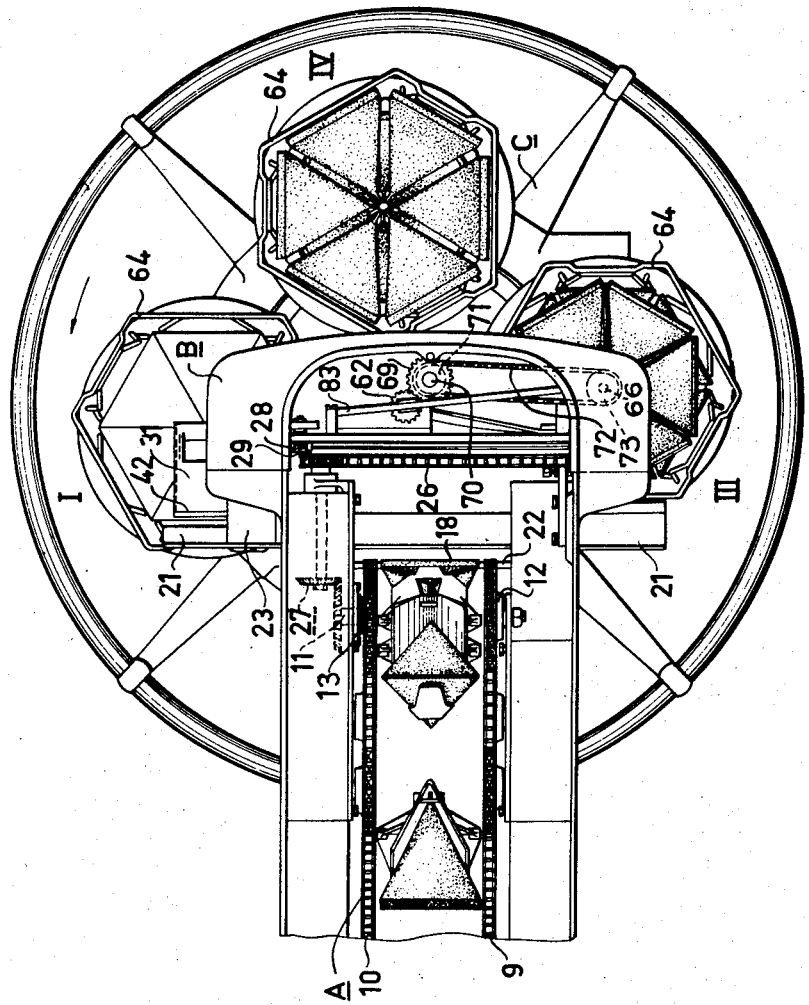

Oct. 13, 1959     H. S. V. JÄRUND     2,908,125
APPARATUS FOR AUTOMATICALLY PACKING
TETRAHEDRON-SHAPED PACKAGES

Filed May 13, 1957     12 Sheets-Sheet 8

Harry Sigurd Valdemar Jarund
INVENTOR

By
Pierce Scheffler & Parker
Attorneys

United States Patent Office 2,908,125
Patented Oct. 13, 1959

2,908,125

APPARATUS FOR AUTOMATICALLY PACKING TETRAHEDRON-SHAPED PACKAGES

Harry Sigurd Valdemar Järund, Lund, Sweden

Application May 13, 1957, Serial No. 658,853

Claims priority, application Sweden May 14, 1956

6 Claims. (Cl. 53—142)

The present invention relates to a method for automatically and closely packing three layers of each the same number of congruent tetrahedron-shaped packages into substantially congruent transport containers. Tetrahedron-shaped packages of flexible material are now widely used as disposable containers, e.g. for milk. The perhaps greatest technical advantage of such packages is that they are particularly well applicable to continuous production and filling. Thus, liquid-filled tetrahedron-shaped packages may be continuously manufactured from a tube of pressure and heat-sealable flexible material through successive pressing and sealing the tube along narrow zones transversely to the tube and alternatively in one or the other of two perpendicular directions, while concurrently the tube is supplied with liquid at such a rate as always to maintain the liquid level in the tube above the zone being sealed. In the process there is formed a strand of filled tetrahedron-shaped packages which are eventually separated from each other through cuts in the sealing zones.

Thus, the individual packages consist of a proper tetrahedron body as well as of two mutually perpendicular fin-like sealing edges each comprising flat-pressed zones of the respective two side walls of the tetrahedron body.

If the manufacturing advantages obtainable by disposable tetrahedron-shaped packages of this kind are to be fully utilized within the distribution field, the most important requisite for a large scale distribution is a possible method for automatic and close packing of the packages into suitable transport containers.

E.g. in the Austrian patent specification No. 183,371 there is disclosed a transport container for regular tetrahedron-shaped packages, said container permitting a close packing of the tetrahedrons. In the usual manner, the container in question comprises a bottom wall and a side wall. The bottom wall is provided with a substantially regular edge contour in one transverse plane and has substantially the shape of a surface limited by said edge contour and generated by a straight line intersecting the edge contour and extending from a point on the edge contour axis, when said line is rotated about the axis to cause its intersectional point on the edge contour to scan the latter. In two planes perpendicular to the container axis the side wall has a base profile substantially similar to and of the same angular position as the bottom edge contour, and a mouth profile substantially similar thereto, respectively. The bottom wall portions each to serve as a supporting surface for an individual tetrahedron of a bottom layer of tetrahedrons form with corresponding side wall portions an angle substantially corresponding to the edge angle of a tetrahedron. The base and mouth profiles of the side wall are of the same angular position and have a number of sides amounting either to six or to infinity—corresponding to a circular profile—and the side wall substantially has the form of a surface portion defined by the base and mouth profiles and generated by a straight line intersecting the base and mouth profiles in equipositioned points and extending in a plane through the container axis, when said straight line is rotated about the container axis.

The container disclosed permits compact or close packing of tetrahedron-shaped packages in several layers each comprising six tetrahedrons. The bottom layer tetrahedrons are packed side by side in such manner that one of their edges will be located in a plane perpendicular to the container axis and at least by its ends engage the side wall. The tetrahedrons of the second layer are caused with one of their edges directed downwards to engage in the wedge-shaped space between two adjacent bottom layer tetrahedrons and to contact the side wall by the ends of the opposite tetrahedron edge, whereas the tetrahedrons of the third layer are packed side by side in such a manner that at least the ends of one edge will engage the side wall and the downwardly facing tetrahedron side extending from said one edge will rest upon the upwardly facing tetrahedron side of at least one tetrahedron of the intermediate layer.

In containers for more than three layers the layer succession set forth is to be repeated, a layer number corresponding to integral multiples of three, however, yielding the most advantageous packing.

As the manufacture of filled tetrahedron-shaped packages in its nature is particularly rational and easily lends itself to the use of fully automatic machines of great production capacity, the need of a method for automatically packing the produced tetrahedron-shaped packages into transport containers for the distribution thereof was actualized already upon the creation of the first machines for manufacturing and filling at least bigger tetrahedron-shaped packages.

However, hitherto no practicable and structurally realizable method for such automatic packing has been proposed, which fact in the first place must be attributed to the particular packing required by the packages in question because of their tetrahedron shape.

The invention now solves the packing problem and the principal features of the method according thereto are that the transport containers are successively and intermittently advanced through three successive packing stations, and that in each packing station a tetrahedron layer is packed tetrahedron by tetrahedron into the container just occupying the packing station in question, each tetrahedron of a layer being packed substantially simultaneously with the tetrahedrons of the same ordinal number in the other two layers and the containers in the three packing stations as well as the container next ahead the first packing station being simultaneously advanced one step in their feed direction after the packing of the respective layers.

According to the invention, in each packing station the tetrahedrons of the corresponding layer when being packed are all caused to describe a path which is caused after the packing of each tetrahedron to perform an intermittent movement in relation to the container in question to distribute the tetrahedrons in the layer. Suitably, the tetrahedrons of all three layers are caused when being packed to perform a substantially free falling, the tetrahedrons of the bottom and top layers starting their falling from substantially equal starting positions in relation to the respective packing movement path, whereas the tetrahedrons of the intermediate layer start their fall from a different starting position as compared to those of the tetrahedrons of the other two layers.

The invention also relates to an apparatus for carrying out the abovestated method. Such apparatus substantially comprises a conveyor for tetrahedrons to be packed; a feed mechanism for successively and intermittently advancing through three successive fixed stations transport containers into which the tetrahedrons are to be packed in three layers of each the same number of tetrahedrons; and a distributor to be supplied with the tetrahedrons by the conveyor and substantially simultaneously in the three stations to supply one tetrahedron at a time into the respective containers, until a layer is completed, whereupon the feed mechanism is arranged to advance the containers of the three stations as well as the container next ahead of the first station one step in the feeding direction.

The invention will be more fully described below with reference to the accompanying drawings, in which:

Fig. 3 illustrates the packing of a tetrahedron in the bottom layer.

Fig. 4 illustrates the packing of a tetrahedron in the intermediate layer.

Fig. 5 illustrates the packing of a tetrahedron in the top layer.

Fig. 6 is a partly sectional side view of a second embodiment of an apparatus for carrying out the method according to the invention.

Fig. 7 is a partly sectional front view of the apparatus shown in Fig. 6.

Fig. 8 is a detail side view of the distributor flap for the bottom tetrahedron layer.

Fig. 9 is a corresponding detail view of the distributor flap for the third tetrahedron layer.

Fig. 10 shows, on an enlarged scale, a vertical central section of the turret table and its associated mechanism shown in the lower part of Fig. 7.

Fig. 11 shows a top view of the apparatus according to Figs. 6 to 10, inclusive, the distributor and conveyor casing being partly broken away and in each of the three packing stations the first tetrahedron being just about to be packed into its respective transport container, whereas a filled transport container in a fourth station is to be removed to be replaced by an empty one.

Figure 1:
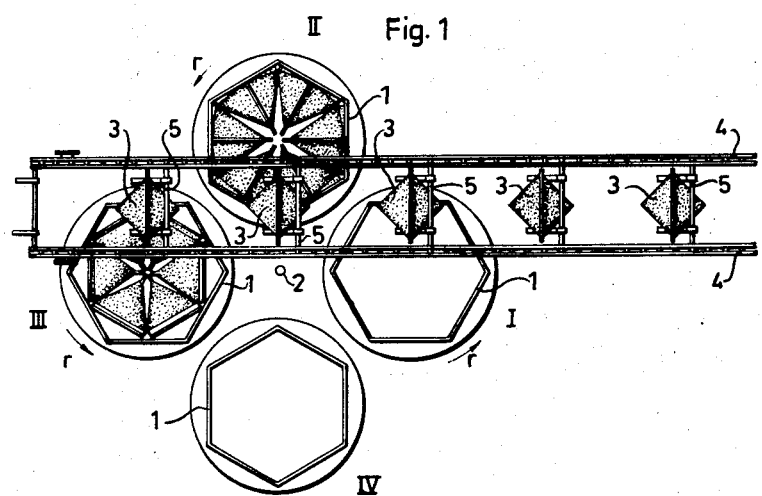
Fig. 1 is a highly schematic top view of an apparatus for carrying out the method according to the invention in packing tetrahedron-shaped packages into hexagonal transport containers having a pyramidal bottom wall.
Figure 2:
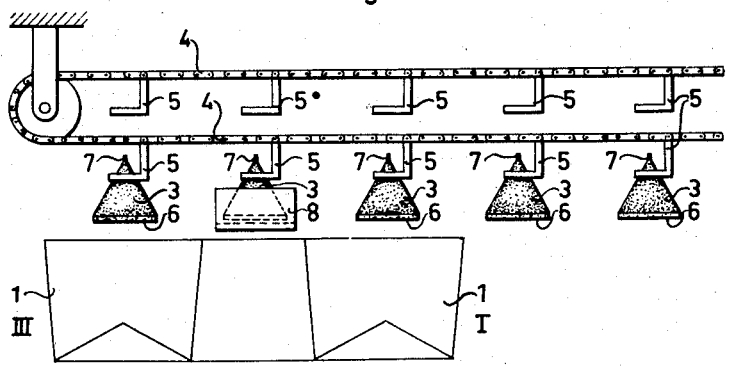
Fig. 2 is a side view of the apparatus shown in Fig. 1.

The method according to the invention provides a variety of ways for its practical application, all of which may have their particular advantages under the premises given. In Figs. 1 to 5, inclusive, there is illustrated a highly schematic apparatus for carrying out the method according to the invention, the simplified construction being better suited to elucidate the practical aspects of the realization of the method according to the invention.

As in the embodiments to be examined further below in the present disclosure, the transport containers wherein to pack tetrahedron-shaped packages are assumed to have a bottom wall in the form of a substantially regular hexagonal pyramid, and a side wall being of substantially regular hexagonal cross-section and composed of six substantially congruent trapezoids. The pyramid sides each serve as a supporting surface for an individual bottom layer tetrahedron form with the corresponding side of the container side wall an angle substantially corresponding to the edge angle of a tetrahedron. Because of the slight outward slope of the side wall the transport containers when empty may be telescoped into each other for space saving purpose.

The invention, however, is not to be considered as limited solely to the transport container illustrated on the drawings, but as applicable to every kind of transport container permitting close and automatic packing of tetrahedrons in three layers each of the same number of tetrahedrons.

In the apparatus outlined in Figs. 1 to 5, inclusive, there are provided four stations I, II, III, and IV for the transport of containers 1. The containers are assumed to perform an intermittent synchronous cyclic permutation movement in a counterclockwise direction between said stations I to IV, inclusive, so as to move the container of station I to station II; the container of station II to station III; the container of station III to station IV; and the container of station IV to station I. The permutation movement is about an axis 2 and the stations I to IV, inclusive, are situated in such a manner in relation to each other and to the axis 2 that a 90 degree rotation of the containers 1 about the axis 2 in the direction of arrow P will correspond to a permutation one step.

The tetrahedrons 3 are supplied by a continuously or intermittently driven endless chain conveyor 4 provided with carriers 5 for the individual tetrahedrons 3, said carriers 5 being uniformly distributed along the chain 4. The chain conveyor 4 extends in such a manner with respect to the containers 1 in stations I, II and III and the carriers 5 have such relationship to each other that three successive carriers 5 during their travel will simultaneously occupy an individual distributing position with respect to their respective stations I, II and III. The tetrahedrons 3 are conveyed suspended by the carriers 5, one sealing edge 6 being directed vertically downwards and extending parallel to the travel direction of the conveyor 4, the other sealing edge 7 being substantially horizontal and perpendicular to the conveyor travel direction. In the distributing position of station I the tetrahedron 3 to be delivered is above the corresponding triangular pyramid side of the container bottom wall, its lower sealing edge 6 extending parallel to the corresponding bottom base edge. In the distributing position of station II the tetrahedron 3 to be delivered is above one corner of the container 1, its upper sealing edge 7 substantially extending in the plane through said corner and through the container axis. In the distributing position of station III as in that of station I the tetrahedron 3 to be delivered is above one triangular pyramid side of the container bottom wall, its lower sealing edge 6 extending parallel to the corresponding bottom base edge.

As already mentioned, three successive carriers 5 will simultaneously arrive at each an individual distributing position in stations I, II, and III, respectively. That fact is utilized for substantially simultaneous distribution of the corresponding three tetrahedrons 3 in the three stations I to III, inclusive. Thus, when three successive carriers 5 together with each an individual tetrahedron 3 suspended thereby arrive at their respective distribution positions a device not shown will cause them substantially simultaneously to release their tetrahedrons 3, so that the latter will start falling downwardly into the container 1 in the respective station I, II or III. When released the tetrahedron 3 of station I is caused to perform a falling movement only restrained by the container bottom wall pyramid side situated beneath the distributing position, as shown in Fig. 3. Advantageously, rotational component should be imparted to the tetrahedron in the distributing moment proper to make it engage the bottom wall substantially by one of its sides. That may be brought about e.g. through causing the carrier 5 when distributing the tetrahedron 3 first to disengage the tetrahedron side facing the container axis, as illustrated by arrow k in Fig. 3. The tetrahedron 3 will land in the container 1 with its lower sealing edge 6 extending along the base edge of the corresponding bottom pyramid side and with one side face landing foremost and resting upon and substantially coinciding with said pyramid side. The edge 7 projecting from this side face is directed towards, i.e. it confronts the vertical axis of the container passing through the apex of the pyramidal bottom.

When distributing in station II, where the container already has a bottom layer of six tetrahedrons packed in station I, the tetrahedron 3, as in the case of the distribution in station I, is caused to make a falling movement of substantially the same starting conditions. Thus, also in this case the carrier 5 is arranged first to disengage the tetrahedron side facing the container axis, and therefore the tetrahedron when falling will rotate about its gravity centre axis parallel to the bottom sealing edge 6. Right under the tetrahedron 3 in the distributing position of station II there is a guide member 8 arranged when distributing the tetrahedron 3 to catch the bottom sealing edge 6 thereof and thus to cause the tetrahedron 3 with the upper sealing edge 7 thereof substantially invariably in the same plane as before, to swing about its lower sealing edge 6, until the originally upper sealing edge 7 is directed downwards and the tetrahedron will continue its temporarily interrupted fall. The tetrahedron 3 distributed from the distributing position of station II will land, with its sealing edge 7 foremost, in the pocket between two adjacent tetrahedrons of the bottom layer previously packed, its sealing edge 7 resting upon the container bottom wall and the opposite sealing edge 6 symmetrically spanning a container side wall corner.

In station III the tetrahedron is delivered substantially in the same manner as in station I with the only exception that the tetrahedron 3 when falling from the carrier 5, which is arranged first to release the tetrahedron side facing the container axis, will be restrained by the upwardly facing sides of two adjacent tetrahedrons 3 of a second or intermediate layer previously packed. In packed condition the top layer tetrahedron thus rests upon two intermediate layer tetrahedrons, it sealing edge 6 being parallel to the corresponding side of the side wall of the container 1 and with its other sealing edge 7 confronting the vertical container axis.

In Figs. 3 to 5, inclusive, for the sake of simplicity the various tetrahedron layers have been indicated each by one single tetrahedron, which of course is inappropriate but benefits the description purpose.

After each distributing operation the containers 1 in stations I to III, inclusive, have to rotate an angle of 60 degrees about the respective container axis e.g. in the direction of arrow r to make the next tetrahedron 3 distributed into each container 1 land beside the one just packed. For such rotation the period of time corresponding to the conveyor 4 travelling three carrier pitch length is available. Advantageously, the containers 1 of stations I to III, inclusive, are rotated synchronously. When a layer of tetrahedrons has been packed in the packing stations I to II, inclusive, the above-mentioned permutation of the containers 1 is effected whereupon the distribution is contained in the manner already described.

For the permutation movement the same period of time is available as for the container rotation.

The container 1 moved from station III to station IV by the permutation contains three layers each of six tetrahedrons and is thus completely filled, unless it is intended to contain a number of layers corresponding to a different integral multiple of three than one. When applying packing of that kind, the containers in question permit the packing of layers in a number being a different integral multiple of three than one with unspoiled compactness, providing the containers are of sufficient height and the tetrahedrons proper will suffer no damage from the multiplication of the three layers. If each container is to be filled with only three layers, the container 1 arriving at station IV from station III should be removed and replaced by an empty container 1 to participate in the permutation through stations I to III, inclusive.

Of course, the method according to the invention may be carried out by means of modified embodiments of the apparatus above-described and schematically shown in Figs. 1 to 5, inclusive.

Although, from many points of view a rotational movement is the most advantageous one for the intermittent feed and permutation of the containers between the packing stations I to III, inclusive, inter alia because it permits a compact apparatus construction, a linear array of stations I to III, inclusive, is quite possible, providing the conveyor and the distributor for the tetrahedrons are correspondingly modified. Nor is a tetrahedron conveyor common to all packing stations I to III, inclusive, necessary. The method according to the invention may just as well be carried out by an apparatus, wherein the tetrahedrons are conveyed to the packing stations by means of a separate conveyor for each station. The only requirement is that the distribution of corresponding tetrahedrons in the packing stations is effected in synchronous relationship and that the movement of the transport containers for the passage through the packing stations I to III, inclusive, is also effected in synchronous relationship.

In Figs. 6 to 15, inclusive, there is illustrated an embodiment of an apparatus for carrying out the method according to the invention. Said embodiment having many features in common with the schematic embodiment shown in Figs. 1 to 5, inclusive, may be said to comprise three main parts, viz. a bucket elevator A, a distributor B, and a turret table C. The apparatus is designed and built as a compact unit to be attached to a machine for continuous manufacture and filling of tetrahedron-shaped packages and to be synchronously driven therefrom.

As shown in Figs. 6, 7, 11, and 12, the bucket elevator A consists of an endless conveyor having parallel twin chains 9 and 10, in the vicinity of the distributor B being passed over two return sprocket wheels 12 and 13, respectively, on a common horizontal axis 11. The chains 9 and 10 extend from a lower return point in the vicinity of the output end of a machine for the continuous manufacture of filled tetrahedron-shaped packages and travel along a sloping path up to the return point comprising the sprocket wheels 12 and 13 in the vicinity of the distributor B, the two runs of the chains 9 and 10 just before the latter return point being given a substantially horizontal extension by means of suitable guide sprocket wheels 14 and 15.

With uniform pitch along the conveyor and between the corresponding runs of the two chains 9 and 10 there are provided buckets 16 each to carry a separate tetrahedron. The chains 9 and 10 are driven in such a way that their upper run will travel up to the upper return point, and therefore the buckets 16 will be in their active carrying condition as long as they are on the upper runs of the chains 9 and 10.

The buckets 16 have substantially the shape of pockets open forwards in the direction from the chains 9 and 10 and of wedge-shaped cross-section, into which pockets the tetrahedrons are entered one sealing edge 17 foremost, so that said sealing edge 17 during the travel towards the distributor B will be substantially parallel to the direction of travel, the other sealing edge 18 thus being perpendicular thereto. The buckets 16 are suspended between the chains 9 and 10 so as to make their bottom edge supporting the lower sealing edge 18 of the tetrahedrons follow the chain path as far as possible, and thus, when the chains 9 and 10 pass over the sprocket wheels 12 and 13, respectively, the buckets 16 will perform a turning movement to release their respective tetrahedrons. When the buckets 16 turn, the tetrahedrons tend to slide forwardly in the bucket 16, until they finally leave it. If said sliding movement is prevented, the tetrahedron will participate in a greater part of the turning movement of the bucket 16. Along the bottom of every third bucket 16 there is provided a stop 19 arranged during the tetrahedron transport to locate the tetrahedron in relation to the back wall of the bucket 16 and to prevent it from sliding in the bucket 16 at the turning thereof. Along the bottom of the other buckets 16 there is provided a similar stop 20 which, however, is situated further on in the bucket 16 and thus permits a limited sliding movement of the tetrahedron in the bucket at the turning thereof. The tetrahedrons in the bucket 16 having an end stop 20 will leave their buckets at an earlier time during the turning movement than the tetrahedrons in the buckets 16 having a locating stop 19.

Suitably, the bucket elevator is driven at its lower return point from the machine to which the packing apparatus is to be attached.

In Figs. 6, 7, 8, 9, 11 and 12, the distributor B is illustrated in detail. As previously mentioned, it is situated in the vicinity of the upper return point of the bucket elevator. Somewhat before and beneath said return point there is a horizontal upwardly open V-shaped distributing channel 21 extending parallel to the sprocket wheel axis 11 and substantially symmetrically with respect to the bucket elevator, said distributing channel 21 being arranged to catch the tetrahedrons falling out of the buckets 16 having an end stop 20 and landing in the channel 21 sealing edge 18 foremost. Along the distributing channel top edge facing the bucket elevator there is provided a turn rod 22 parallel to said edge, said turn rod 22 being arranged to catch the sealing edge 18 of the tetrahedrons in those buckets 16 having said locating stop 19 so that these tetrahedrons are caused when leaving their respective buckets 16 to "turn" around the rod 22 and upon further fall movement to tend to fall sealing edge 17 foremost.

In the distributing channel 21 there is slidable a pusher 23 carried by a carriage 25 riding on a horizontal bar 24 situated above the channel 21 and extending parallel thereto. Along the bar 24 and of substantially the same extension there is provided an endless chain 26 driven from the sprocket wheel shaft 11 through a bevel gear 27 and by means of a dog 29 engaging a vertical groove 28 of the carriage 25 causing same to perform a reciprocating travelling movement along the bar 24, the pusher 23 performing a corresponding sliding movement in the channel 21.

At the channel end closest to the chain 10 both the channel wall remote to the bucket elevator and the corresponding portion of the opposite channel wall closest to the bottom of the channel 21 have been removed. At the opposite end of the channel the top portion of the channel wall remote from the bucket elevator has been removed so as to leave only a narrow rim thereof along the bottom of the channel 21.

Obliquely above the channel top edge remote from the bucket elevator but beneath the bar 24 there is journalled a shaft 30 parallel to said edge. One end of said shaft 30 carries a flap 31 arranged in its active position functionally to replace the removed bottom and side wall portions of the channel end closest to the chain 10. The other end of the shaft 30 carries a small flap 32 arranged in its active position functionally to replace the removed portion of the side wall at the corresponding end of the channel 21. The flaps 31 and 32 are maintained in their swung-up active position (see Figs. 8 and 9) by a retaining mechanism comprising a pawl 33 in the vicinity of the flap 31 and a detent lever 34, at its free end co-operative with said pawl 33 and its opposite end pivoted to a fixed pivot 35 above the bar 24 for oscillation in a vertical plane parallel to the shaft 30. For oscillation in the same vertical plane there is hinged to the detent lever 34 a bell crank comprising a substantially horizontal catch-shaped arm 36 and a substantially vertical arm 37. The catch 36 is co-operative with a lug 38 or the like on the carriage 25 and is arranged to be caught by said lug 38, when the carriage 25 moves from its dead centre corresponding to the flap 31 towards the middle of the bar 24. When caught by the lug 38, the catch 36 will participate in the movement of the carriage 25, whereby to swing the detent lever 34 out of engagement with the pawl 33, the shaft 30 being released and the flaps 31 and 32 by gravity simultaneously swinging away from the channel 21. Because the free end of the arm 37 is provided with an adjustable stop 39 cooperating with the detent lever 34 to limit the down swinging of the catch 36 in relation to the detent lever 34, the catch 36 when participating in the movement of the carriage 25 will simultaneously swing upwards about the pivot 35 eventually to release the lug 38, the detent lever 34 then returning to its vertical position.

In the vicinity of the flap 32 the shaft 30 is provided with a helicoidal cam 40 being engageable with a cam follower 41 carried by the carriage 25 for resetting the flaps 31 and 32 into their active position, when the carriage 25 moves towards the dead centre corresponding to the flap 32. Upon rotation of the shaft 30 to swing the flaps 31 and 32 upwardly towards the channel 21, the pawl 33 will catch the vertically depending detent lever 34 to retain the shaft in the position corresponding to active flaps 31 and 32.

When the carriage 25 travels towards the dead centre corresponding to the flap 31, the lug 38 will re-engage the catch 36 but will not catch it but slide upon a leading sloping cam surface 42 of the catch 36 to raise the stop shoulder 43 thereof over and above the lug 38.

Just before the pusher 23 when moving towards the channel end corresponding to the flap 32 passes the centre of the channel 21, a tetrahedron will fall down sealing edge 18 foremost into the channel from the first one of two successive buckets 16 of the kind having an end stop 20 and arriving at the upper return point of the bucket elevator. Said tetrahedron will land ahead of the pusher 23 and will be pushed thereby outwards to the channel end corresponding to the flap 32. During that movement the carriage 25, as previously mentioned, will reset the two flaps 31 and 32 to their swung-up active positions in relation to the channel 21 by means of its cam follower 41 and the cam 40 on the axis 30. Therefore when the pusher 23 in its dead centre corresponding to flap 32 releases the tetrahedron in question, the same will remain standing in the channel 21, its top corner facing away from the bucket elevator leaning against the flap 32.

Similarly, just before the pusher 23 when moving towards the opposite end of the channel passes the centre thereof, the next tetrahedron from a bucket 16 having an end stop 20 will land in the channel ahead of the pusher 23, which when continuing its movement towards the channel end corresponding to the larger flap 31 will push the tetrahedron in question before itself. When the pusher 23 reaches its dead centre at this end of the channel 21 and starts its movement in the opposite direction, the tetrahedron will remain standing in the channel 21, its sealing edge 18 resting upon a bottom flange 42 of the flap 31 and its tetrahedron side facing away from the bucket elevator engaging that portion of the same flap 31 replacing the corresponding channel side wall.

A short period of time after the pusher 23 has reversed at the channel end corresponding to the flap 31 the carriage 25 carrying the pusher 23 will release the retaining mechanism of the shaft 30 comprising the pawl 33 and the detent lever 34, the flaps 31 and 32 then being released to swing away from the channel 21 by gravity as well as under the influence of the contacting pressure of the respective tetrahedron, so that the corresponding tetrahedrons will start falling out of the channel 21.

Substantially simultaneously with the release of the flaps 31 and 32 the bucket 16 with end stop 19 next succeeding to the buckets 16 having end stops 20 just mentioned will have reached the upper return point of the bucket elevator and in co-operation with the turn rod 22 have delivered its respective tetrahedron not landing in the channel 21 but starting a falling movement sealing edge 17 foremost immediately after its "turning" around the turn rod 22.

Thus, the three tetrahedrons will perform their respective falls substantially simultaneously, the movements in question resulting in the packing of the tetrahedrons in the corresponding transport containers.

The operation cycle just described will be repeated in similar manner with respect to the succeeding buckets 16 taken three and three.

The turret table C is shown in Figs. 6, 7, 10, 11, 13, 14, 15, and 17. It is situated below the distributor B and is arranged to advance three respective transport containers to active positions beneath the two ends of the distributing channel 21 and beneath the turn rod 22, respectively, and to maintain said containers in their active position when packing the respective tetrahedron layer.

Figure 14:
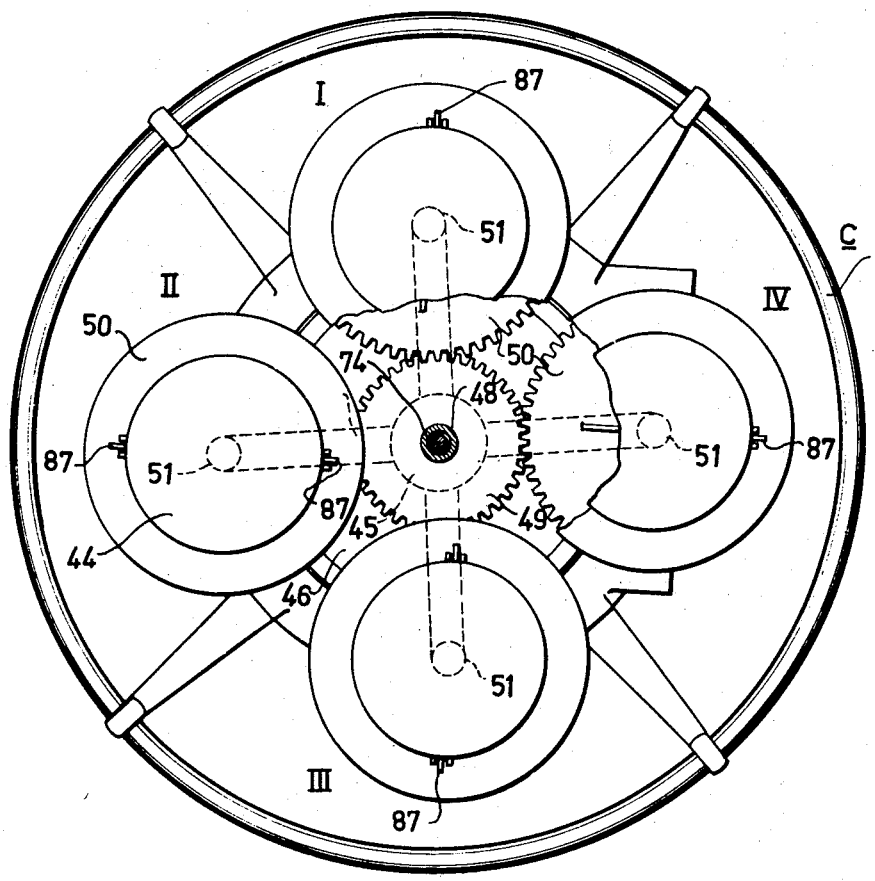
Fig. 14 is a view corresponding to Fig. 13, the transport containers being removed from their respective turn discs and the turret table construction being shown more in detail.

As apparent from Fig. 14, the turret table comprises a horizontal cross 43 having four arms of equal length, the free ends of which each rotatably support a separate turn disc 44. The cross 43 is rotatable about its centre to cause the turn discs 44 together with the cross 43 to perform a rotational movement in one and the same horizontal plane. The centre of the cross 43 is provided with a hub 45 fixed to a vertical sleeve shaft 47 rotatable but not displaceable in a fixed housing 46. In said sleeve shaft 47 and relative thereto is rotatable but not displaceable a hollow spindle 48, the upper end of which reaches up to the distributor B, its lower end reaching beneath the sleeve shaft 47. At the top of the hub 45 of the cross 43 the hollow spindle 48 is provided with a gear 49 in constant mesh with four gears 50 each fixed to an individual turn disc 44 and thus rotatable about the same vertical shaft 51 as the respective turn disc 44.

By means of a double-acting snap coupling the sleeve shaft 47 is fixable to the housing 46 and interlockable with the hollow spindle 48, respectively. At points having a mutual angular spacing of 90 degrees along the circumference the sleeve shaft 47, the hollow spindle 48 and the housing each are provided with a radial bore 52, 53 and 54, respectively. The bores 52 and 53 pass through the wall of the sleeve shaft 47 and the hollow spindle, respectively, are settable in alignment with each other and with bore 54. In the bore 54 a ball 55 is displaceable towards the sleeve shaft 47 under the action of a spring 56. In the bore 52 there is slidable a plunger 57 having an active length somewhat less than the length of the bore 52, whereas in the bore 53 there is slidable a plunger 58 of an active length somewhat exceeding the length of the bore 53. The ball 55 and the plungers 57 and 58 are co-operative with each other. The ball 55 and the plunger 58 are slidable partly into the bore 52 from mutually opposite directions. When the bores 52, 53 and 54 are aligned, the ball 55 under the influence of its spring 56 tends to partly enter the bore 52 to displace the plunger 57 therein towards the hollow spindle 48, so that said plunger 57 will tend to move the plunger 58 out of the bore 52. In the hollow spindle 48 there is longitudinally slidable a circular section actuating slide 59 co-operative with the end of the plunger 58 remote from the sleeve shaft and conically tapered upwardly. Said actuating slide 59 is arranged, when moved upwardly in the hollow spindle 48, to displace the plunger 58 towards the sleeve shaft 47, so that the actuating slide 58, when the bores 52, 53 and 54 are aligned, will enter the bore 52 thereby to displace the plunger 57 which in turn will fully remove the ball 55 from the bore 52 against the action of the spring 56.

When the ball 55 is in engagement with the bore 52, the sleeve shaft 47 is angularly fixed relative to the housing 46, whereas the hollow spindle 48 is rotatable in relation to the sleeve shaft 47. When the plunger 58 is in engagement with the bore 52, the sleeve shaft 47 and the hollow spindle 48 are angularly interlocked respectively to each other but rotatable in unison in relation to the housing 46.

At its lower end the hollow spindle 48 carries a wheel disc 60, the underside of which is provided with an internal Geneva movement Maltese cross. In a manner known per se, a Geneva movement crank 62 provided with retaining segment and fixed to a vertical shaft is co-operative with the Maltese cross. Through a bevel gear 63 the Geneva crank 62 is driven in the direction corresponding to counter-clockwise rotation of the hollow spindle 48, when viewed from above.

Figure 13:
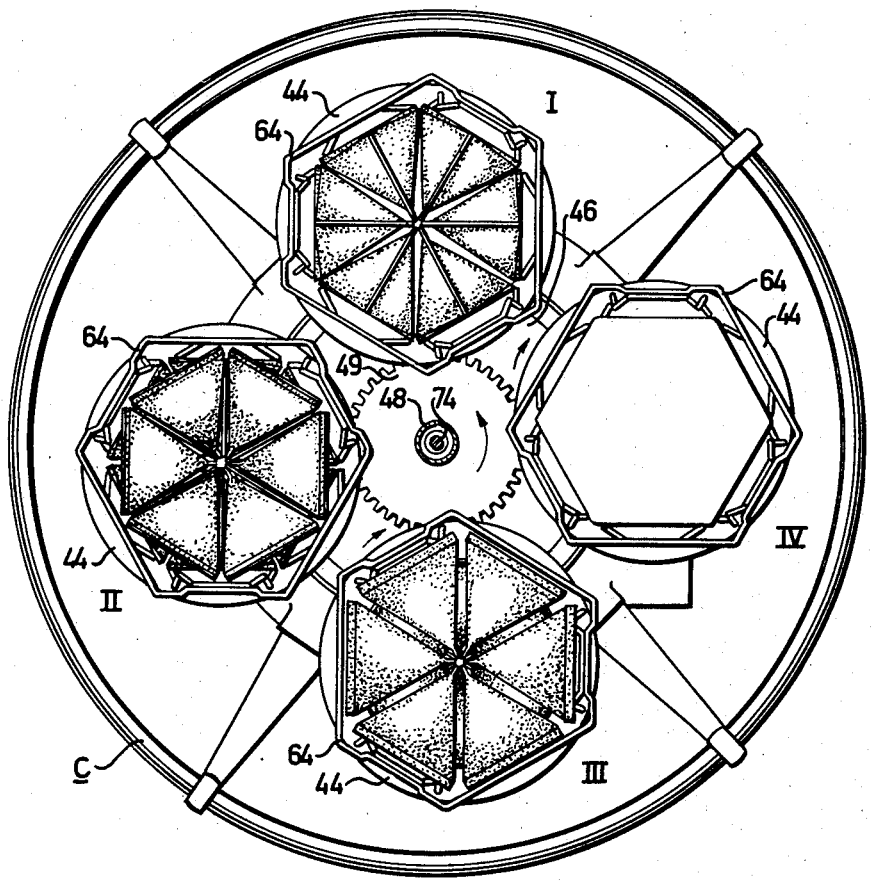
Fig. 13 is a top view of the turret table shown in Fig. 11, the only difference being that the filled transport container has been replaced by an empty one, and, in addition, part of the turret table central portion has been broken away to expose the gear common to the four turn discs.
Figure 15:
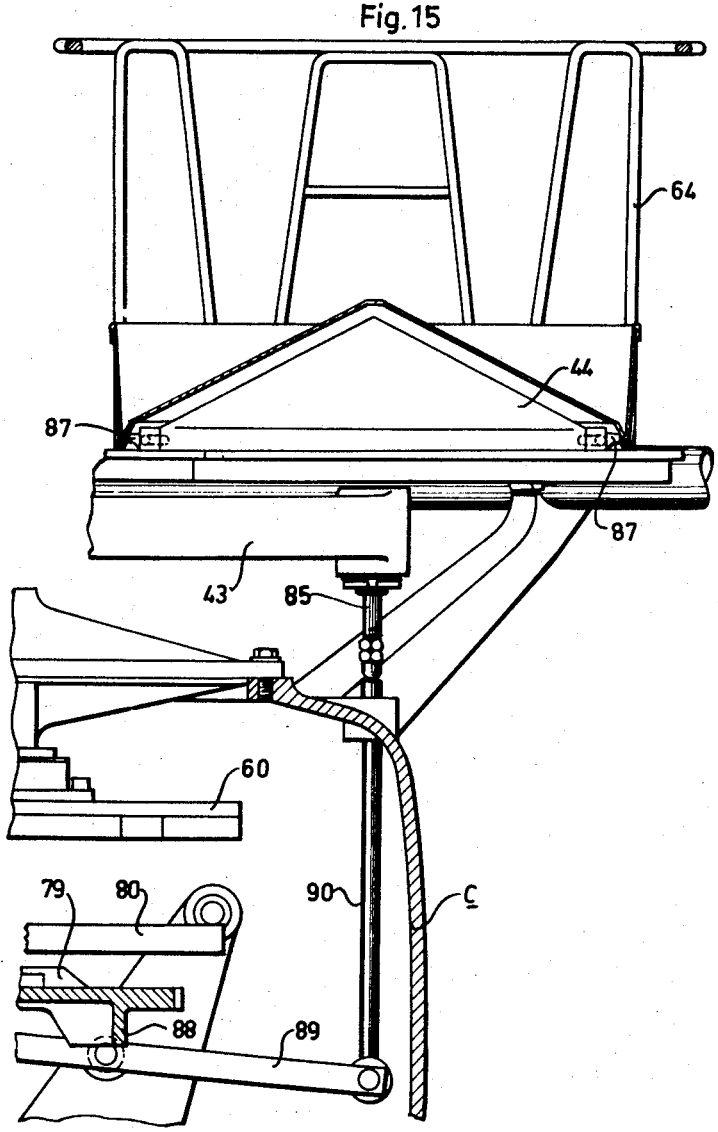
Fig. 15 is a partly sectional detail view of the turret table and shows the mechanism for locking the transport containers to the respective turn discs.

As particularly apparent from Figs. 11, 13 and 15, the turn discs 44 are arranged each to support an individual hexagonal transport container 64 of the above-mentioned type having a regular hexagonal pyramid bottom wall, the sides of which form an angle substantially corresponding to the edge angle of a tetrahedron with the corresponding portions of the container side wall.

The transport containers 64 shown in the last-mentioned figures are provided with a skeleton side wall, and therefore the containers 64 very nearly have the nature of baskets yet functionally correspond to containers having an unbroken side wall. Further, the side walls of the containers 64 slant or slope slightly outwards to ensure telescopic stacking of empty containers.

When in engagement with the bores 52 of the sleeve shaft 47, the said balls 55 determine such a position for the cross 43 that three of the turn discs 44 together with the transport containers 64 supported thereby occupy an active packing position in relation to that end of the distributing channel 21 corresponding to the large flap 31, to the turn rod 22, and to that end of the channel 21 corresponding to the small flap 32, respectively. Analogous to the system applied in the introduction, in the following said packing stations will be designated by I, II and III, respectively, the station corresponding to the position of the fourth turn disc 44 determined by the balls 55 being designated by IV.

The turn discs 44 are arranged to support their transport containers 64 in such a manner that the transport container 64 in the packing station I upon the distribution of a tetrahedron from the corresponding end of the channel 21 has the base edge of the nearest bottom wall pyramid side parallel to but somewhat behind the vertical plane through the bottom of the channel 21, and besides the height line of same bottom wall pyramid side through the pyramid apex extends in substantially the same vertical plane as the sealing edge 17 of the tetrahedron in question. The rotation centre of the cross 43 is situated in such relation to the distributor B that, because of the gear wheel engagement of the turn discs 44, the container 64 in the packing station III upon the distribution of a tetrahedron from the corresponding end of the channel 21 will have the base edge of the nearest bottom wall pyramid side parallel to but somewhat before the vertical plane through the bottom of the channel 21, and besides the height line of same pyramid side through the pyramid apex will extend in substantially the same vertical plane as the sealing edge 17 of the tetrahedron in question. In the packing station II the container 64, upon the distribution of the tetrahedron via the turn rod 22, has the apex of its bottom wall pyramid situated substantially right under or somewhat behind the turn rod 22, and besides the edge line between two adjacent sides of the bottom wall pyramid of the container 64 is in substantially the same vertical plane as the sealing edge 17 of the tetrahedron in question.

As mentioned above, the distributor B distributes three tetrahedrons at a time, one tetrahedron in each of the packing positions I, II and III. Upon the release of the flap 31, the tetrahedron of the packing station I will perform a falling movement sealing edge 18 foremost down into the corresponding container 64 to land upon a bottom wall pyramid side, the sealing edge 18 resting in the angle between said pyramid side and the container side wall. After turning about the turn rod 22, the tetrahedron of the packing station II will perform a falling movement sealing edge 17 foremost down into the corresponding container 64 having a bottom layer of six tetrahedrons previously packed side by side in the packing station I, the tetrahedron in question landing in the wedge-shaped space between two adjacent bottom layer tetrahedrons to make its lower sealing edge 17 rest upon the bottom wall and its upper sealing edge 18 spanning a container corner rest against the container side wall. Upon the release of the flap 32 the tetrahedron of the packing station III will perform first a pivoting movement about its sealing edge 18 supported by the bottom of the channel 21 and then a fall movement down into the corresponding container 64 having a bottom layer and an intermediate layer each of six tetrahedrons previously packed in the packing stations I and II, respectively, the tetrahedron in question ultimately landing on the top of said two layers, its sealing edge 18 extending along the corresponding container side wall portion and its lower tetrahedron side substantially symmetrically spanning the space between two adjacent tetrahedrons of said intermediate layer.

The Geneva movement crank 62 is driven synchronously with the bucket elevator in such way as to rotate the wheel disc 60 and thus both the hollow spindle 48 and the gear 49 a quarter of a revolution upon each distribution of three tetrahedrons from the distributor B. The gear ratio between the gear 49 and the gears 50 of the turn discs 44 in constant mesh therewith is such that rotating the gear 49 a quarter of a revolution will rotate all turn discs 44 an angle of 60 degrees about the shafts 51. The intermittent 60 degree rotation of the turn discs 44 and of the containers 64 supported thereby is effected after each distributing operation but that of the last, i.e. the sixth, tetrahedron of the three layers in question, when the rotation of the wheel disc 60 will result in a simultaneous rotation of the sleeve shaft 47 and the hollow spindle 48, because the ball 55 is moved out of engagement with the bore 52 of the sleeve shaft 47 and the plunger 58 is moved into engagement therewith. Thus, the cross 43 is caused to rotate a quarter of a revolution for cyclic permutation of the turn discs 44 in the stations I, II, III and IV to bring the turn disc 44 of station IV into station I; the turn disc 44 of station I into station II; the turn disc 44 of station III into station IV. At said rotation of the cross 43 no rotation of the turn discs 44 is effected in relation to the cross 43, as the sleeve shaft 47 and the hollow spindle 48 are interlocked at that time. After the 90 degree rotation of the cross 43 the packing of the tetrahedrons will proceed in the packing stations I, II and III in the manner previously described, the turn discs 44 being rotated 60 degrees after each distributing operation but the last one of the three layers, when the cross 43 again will be rotated a quarter of a revolution etc.

As the tetrahedrons of the top layer are packed upon a bed sloping inwardly towards the axis of the container, it may be necessary to see to it that the top layer tetrahedrons when being packed are prevented from sliding inwardly towards and beyond the container centre to complicate the packing operation in the packing station III. For that purpose there is provided a locating member 65 in the shape of a regular six point star and carried by a shaft 66 slidable in the distributor B. Said locating member 65 is situated above the container occupying the packing station III, its centre being in the extension of the container axis. When through rotating the cross 43 a new container 64 is advanced to packing station III the locating member 65 is lowered towards the tetrahedron layer already present in the container 64. The locating member 65 is provided with six pockets 67 each supportingly to accommodate an individual sealing edge 17 of the tetrahedrons in the third layer to be packed.

At its upper end in the distributor B the hollow spindle 48 is provided with a gear 69 fixed to a vertical shaft 70 journalled in the distributor B. To the latter shaft 70 there is also fixed a sprocket 71 operatively connected to a sprocket 73 fixed to the shaft 66 of the locating member 65 through an endless chain 72. By the arrangement just disclosed there will be gained the advantage that the locating member 65 will participate in the intermittent rotation of the turn discs 44 about the shafts 51 thereof and thus will rotate in unison with the container 64 occupying packing station III.

In the hollow spindle 48 there is slidable a rod 74 the upper end of which reaches above the hollow spindle 48 in the distributor B, its lower end being co-operative with an actuating rod 75 axially passing through a central bore 76 in the conical slide 59.

In the housing 46 there is rotatable a horizontal spur gear 77 meshing with a spur gear 78 fixed to the shaft 61. The top side of the spur gear 77 is provided with a cam 79 to co-operate with a lever 80 at one end pivoted for oscillation in a vertical plane. The free end of the lever 80 co-operates with the lower end of the actuating rod 75, said rod end through a spring 81 being connected to the lower end of the slide 59 actuated by said spring in the direction towards a stop 82 along the actuating rod 75. The cam 79 is shaped and arranged in such a manner as to swing the lever upwards and lift the actuating rod as well as the rod 74 just before the cross 43 is rotated a quarter of a revolution. The upper end of the last-mentioned rod 74 is co-operative with an arm 83 pivoted by one end in the distributor B for oscillation in a vertical plane and by the other end operatively connected to the shaft 66 of the locating member 65 for moving same. The raising of the rod 74 will raise the arm 83 to move the shaft 66 upwards, thus removing the locating member 65 out of the container 64 occupying packing station III. Further, the raising of the arm 80 will move the slide 59 upwards under the action of the spring 81, thus moving the plungers 58 into engagement with the bores 52 and simultaneously moving the balls 55 out of engagement with same bores 52. Thus, when the locating member 65 has been removed out of the container 64, the cross 43 is rotated a quarter of a revolution. The cam 79 is arranged after the rotation of the cross 43 to permit lowering of the actuating rod 75. The latter is arranged by means of the stop 82 to make the slide 59 participate in its lowering movement to reengage the balls 59 into the bores 52, while the plungers 58 are moved out of same.

The shafts 51 of the turn discs 44 are provided with a central bore 84 wherein a vertical rod 85 is slidable. At its upper end beneath the disc body 44 proper, the rod 85 carries a yoke 86 having two yoke arms of equal length, said yoke arms by their free ends each being hinged to an individual link 87, the free end of which is slidable in a slot 88 in the turn disc edge and being arranged to project outside the same when in its active position. When the yoke 86 is raised through the upward movement of the rod 85 the free ends of the links 87 are moved inwardly towards the turn disc edge. As apparent from Fig. 15, the containers 64 are of such construction that the free ends of the links 87 are co-operative with the respective container 64 for locating the same with respect to the turn disc 44 in question.

The underside of the gear 77 is provided with a cam 88 arranged by means of a mechanism comprising a lever arm 89 and a plunger 90 to actuate the rod 85 of the turn disc 44 occupying position IV, thus raising said rod 85 to its upper position just after the turn disc 44 in question arrives at station IV, the rod 85 being again lowered to its lower position just before same turn disc 44 will leave station IV and advance to packing station I.

Thus, the packing station IV of the turret table C may be utilized as replacing station for the containers 64, wherein filled containers 64 may be removed one by one from the turret table C and empty containers 64 may be placed upon same. During the replacing period the respective free link ends are retracted but upon advancement of the turn disc 44 in question to packing station I through rotation of the cross 43, these link ends are moved outwardly to their active position, wherein they retain the container 64 upon and locate same with respect to the turn disc 44.

From the above description is apparent as plainly as could be desired the mode of operation of the packing apparatus shown in Figs. 6 to 15, inclusive, and 17, thus making a summarizing review of the operation superfluous. However, some of these figures of the drawing do require elucidatory comments.

Fig. 11 illustrates that situation during the operation of the apparatus when the first tetrahedron of each layer is about to be distributed in stations I, II, III. In station IV the filled container 64 is about to be removed and be replaced by an empty container 64.

Figure 12:
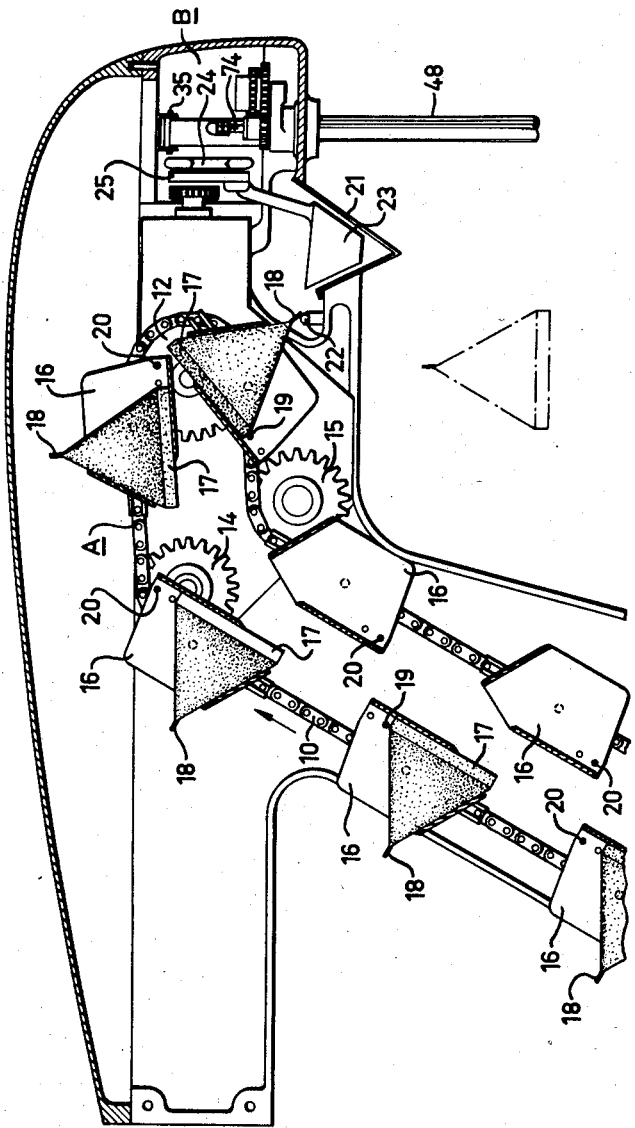
Fig. 12 is a partly sectional side view of the bucket elevator shown in Fig. 11.

The same situation is illustrated in Fig. 12, from which is clearly apparent that the turn rod 22 co-operates with the sealing edge 18 of the tetrahedrons in the bucket 16 having a locating stop 19.

Fig. 13 shows the turret table C in the same situation as that of Fig. 11 with the only exception that the filled container 64 of the replacing station IV has been removed and been replaced by an empty one.

Figure 16:
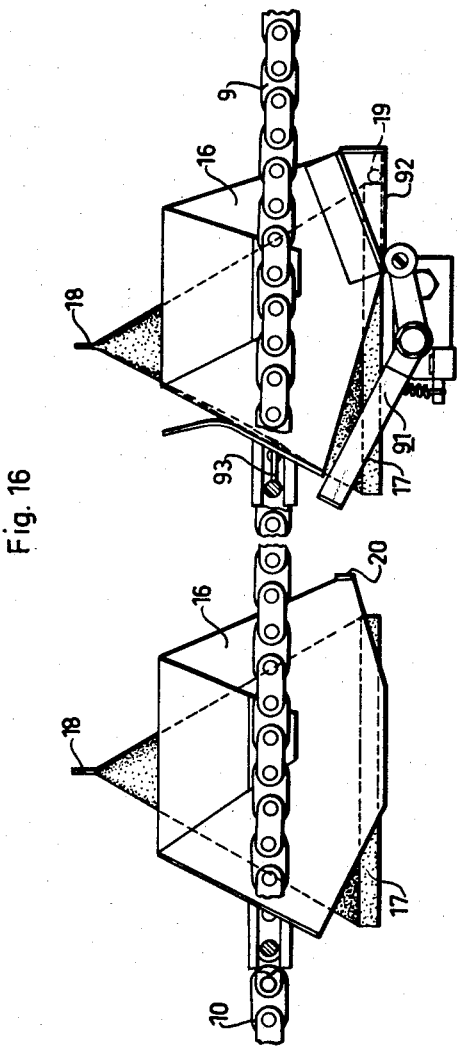
Fig. 16 illustrates a second embodiment of the bucket elevator as well as the associated bucket mechanisms.
Figure 17:
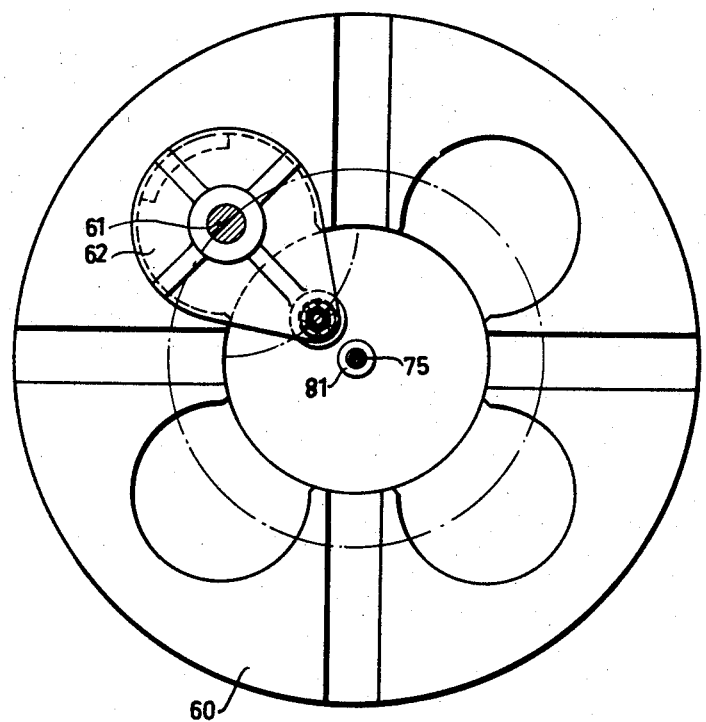
Fig. 17 is a detail view of the turret table mechanism.

Since it is important with respect to the buckets 16 provided with locating stops 19 that the tetrahedrons are sufficiently entered into the buckets 16 to make the front end of the sealing edge 17 occupy a position behind the locating stop 19, the bucket elevator A may be provided with a means 91 for fulfilling that requirement, as shown in Fig. 16, where a somewhat modified bucket construction is illustrated. Said means 91 is attached to the frame of the bucket elevator A and is operable by a projection 92 carried by each bucket 16 having a locating stop 19 to an active position in relation to the bucket in question, in which position said means 91 through a slot in the bucket co-operates with the lower sealing edge 17 of the tetrahedron in the bucket, so that said sealing edge 17 will be moved downwards and backwards in the bucket. Thus, the tetrahedron will occupy such position wanted in the bucket not spoiling its proper distribution out of the bucket. The distributing operation may be made less critical if the tetrahedrons through the downward and backward movement in the locating stop buckets are clamped therein to a varying extent. Therefore, suitably the buckets in question are also provided with a member 93 arranged at a suitable time during the turning of the buckets to push at the back of the tetrahedrons in a direction corresponding to the removal thereof out of the buckets, thus initiating the swinging movement of the tetrahedron about the locating stop.

Also, with regard to the packing apparatus according to Figs. 6 to 17, inclusive, the modifications mentioned in the introductory study of Figs. 1 to 5, inclusive, may be applied.

In addition, other modifications are of course possible within the scope of the invention. Thus, the distributor B may be provided with a device bringing about the distribution of the tetrahedrons of every third bucket direct to the turn rod without necessitating any structural or functional differences between the buckets of the elevator A. Another case wherein all the buckets of the elevator A may be of one and the same construction and function is when the distributing channel 21 is arranged also to catch the tetrahedrons intended for the intermediate layer and to release each of said intermediate layer tetrahedrons simultaneously with the two corresponding bottom layer and top layer tetrahedrons. In such case the turn rod may be dispensed with and distributing channel will have to be provided with a suitable extra releasing means, the intermediate layer tetrahedrons when leaving the distributing channel 21 after their dwell period therein effecting more or less the same falling and rotating movement as that effected by the intermediate layer tetrahedrons in the embodiment shown on the drawings after having contacted the turn rod. Otherwise, all those constructions of the distributor B permitting substantially simultaneous distribution of three tetrahedrons, one in each of three stations, fall within the scope of the invention.

Through corresponding modifications of the packing apparatus the turret table C may of course be provided with five turn discs instead of four. A turret table having five turn discs, i.e. five stations, may turn out to be appropriate where the packing apparatus is to be attached to an apparatus for automatically removing filled containers from the turret table and to an apparatus for automatically placing empty containers thereon.

What I claim is:

1. Apparatus for automatically and closely packing three superposed layers each of six congruent packages of substantially regular tetrahedron shape into open top containers, said apparatus comprising means supporting a plurality of said containers in an upright attitude, means for advancing said container supporting means along a predetermined path to predetermined packing stations for said containers, means for periodically dropping said tetrahedron packages three at a time into respective containers from tetrahedron package supply means located above said container packing stations, the tetrahedron packages forming the top and bottom layers landing in their respective containers each with one side face foremost and with one edge projecting from said side face confronting the container axis and the tetrahedron packages forming the intermediate layer each landing side edge foremost between adjacent tetrahedron packages of the bottom layer, means effecting relative rotation between each of said containers and its respective package dropping means through an angle of 60° after each of five consecutive periodic droppings of tetrahedron packages, and means actuated when the sixth package of each layer has been dropped to advance said container supporting means and containers thereon from one to the next succeeding packing station.

2. Apparatus for automatically and closely packing three superposed layers each of six congruent packages of substantially regular tetrahedron shape into open top containers, said apparatus comprising a distributor, a rotatable turret table located below said distributor, said table having a plurality of turn discs thereon mounted for rotation about their respective axes, each said container being mounted on one of said turn discs, and each of said discs and containers thereon constituting a packing station, means periodically dropping said tetrahedron packages three at a time from said distributor into respective containers located on said turn discs, the tetrahedron packages forming the top and bottom layers landing in their respective containers each with one side face foremost and with one edge projecting from said side face confronting the container axis and the tetrahedron packages forming the intermediate layer each landing side edge foremost between adjacent tetrahedron packages of the bottom layer, means rotating each of said turn discs and containers thereon through an angle of 60° after each of five consecutive droppings of tetrahedron packages from said distributor, and means actuated when the sixth tetrahedron package of each layer has been dropped to rotate said turret table and advance said turn discs and containers thereon to the next succeeding packing station.

3. Apparatus for automatically and closely packing three superposed layers each of six congruent packages of substantially regular tetrahedron shape into open top containers, said apparatus comprising a conveyor for said tetrahedron packages, a distribution channel located transverse to said conveyor and receiving two tetrahedron packages in succession from said conveyor, pusher means reciprocated in said distribution channel for pushing the tetrahedron packages to opposite ends of said distributing channel to release positions, a rotatable turret table located below said distribution channel, said table having a plurality of turn discs thereon mounted for rotation about their respective axes, each said container being mounted on one of said turn discs and each of said discs and containers thereon constituting a packing station for receiving tetrahedron packages, means dropping simultaneously the two tetrahedron packages from the release positions on said distribution channel and a third tetrahedron package directly from said conveyor into respective containers located on said turn discs, the tetrahedron packages forming the top and bottom layers landing in their respective containers each with one side face foremost and with one edge projecting from said side face confronting the container axis and the tetrahedron packages forming the intermediate layer landing side edge foremost between adjacent tetrahedron packages of the bottom layer, means rotating each of said turn discs and containers thereon through an angle of 60° after each of five consecutive droppings of tetrahedron packages from said distribution channel and conveyor, and means actuated when the sixth package of each layer has been dropped to rotate said turret table and advance said turn discs and containers thereon to the next succeeding packing station.

4. Apparatus as defined in claim 3 and which further includes guide means cooperative with one of said containers for locating the tetrahedron packages of the top layer dropped into said container.

5. Apparatus as defined in claim 3 wherein said turret table includes four turn discs rotatably mounted thereon, said discs being spaced 90° apart, and said turret table is rotated in steps through an angle of 90° to advance said turn discs and the containers thereon from one packing station to the next succeeding packing station.

6. Apparatus as defined in claim 3 wherein said conveyor includes buckets for receiving and advancing said tetrahedron packages to said distribution channel and for direct dropping of tetrahedron packages therefrom into said containers, two of said buckets in succession including stop means locating said tetrahedron packages in the respective buckets in such position as to be released from said conveyor into said distributing channel and the next succeeding bucket including stop means locating the tetrahedron package therein in such position as to be released from said conveyor for direct falling movement into the container below.

References Cited in the file of this patent
UNITED STATES PATENTS

| | | |
|---|---|---|
| 1,293,625 | Smith | Feb. 4, 1919 |
| 2,325,816 | Waters | Aug. 3, 1943 |